(12) United States Patent
Qi et al.

(10) Patent No.: US 11,390,304 B2
(45) Date of Patent: Jul. 19, 2022

(54) RAIL VEHICLE, DRIVER'S CABIN AND COMPOSITE ALUMINUM PLATE ASSEMBLY

(71) Applicant: CRRC QINGDAO SIFANG CO., LTD., Shandong (CN)

(72) Inventors: Kaiwen Qi, Shandong (CN); Wenhua Li, Shandong (CN); Honglei Tian, Shandong (CN); Yuzhan Yuan, Shandong (CN); Ye Zhang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 0 days.

(21) Appl. No.: 17/420,724

(22) PCT Filed: Oct. 30, 2019

(86) PCT No.: PCT/CN2019/114370
§ 371 (c)(1),
(2) Date: Jul. 6, 2021

(87) PCT Pub. No.: WO2020/177354
PCT Pub. Date: Sep. 10, 2020

(65) Prior Publication Data
US 2022/0081013 A1 Mar. 17, 2022

(30) Foreign Application Priority Data
Mar. 1, 2019 (CN) .......................... 201910157014.7

(51) Int. Cl.
*B61D 17/04* (2006.01)
*B61C 17/04* (2006.01)
(52) U.S. Cl.
CPC ............ *B61C 17/04* (2013.01); *B61D 17/041* (2013.01); *B61D 17/045* (2013.01)

(58) Field of Classification Search
CPC ...... B61C 17/04; B61D 17/041; B61D 17/045
See application file for complete search history.

(56) References Cited

U.S. PATENT DOCUMENTS

| 5,140,913 A * | 8/1992 | Takeichi ................ B61D 17/04 |
| | | 105/397 |
| 5,353,502 A | 10/1994 | Hattori et al. |
| 2004/0067373 A1 | 4/2004 | Kennedy |

FOREIGN PATENT DOCUMENTS

| CN | 201291614 Y | 8/2009 |
| CN | 205292646 U | 6/2016 |

(Continued)

OTHER PUBLICATIONS

The Singaporean 1st Office Action dated Oct. 1, 2021 for Application No. 11202010468X.

(Continued)

*Primary Examiner* — Robert J McCarry, Jr.
(74) *Attorney, Agent, or Firm* — Yue (Robert) Xu; Apex Attorneys at Law, LLP

(57) ABSTRACT

A composite aluminum plate assembly comprises at least two aluminum honeycomb profile units; each aluminum honeycomb profile unit comprises a support component, an interlayer aluminum honeycomb, a first aluminum plate and a second aluminum plate, the interlayer aluminum honeycomb being filled between the first aluminum plate and the second aluminum plate; an extension section is provided on an abutting side of at least one of two sides of aluminum plates of the aluminum honeycomb profile unit, the extension section extending to the exterior of the interlayer aluminum honeycomb at the same side; the strength of the support component is greater than that of the interlayer aluminum honeycomb, and extension sections of two adja- (Continued)

cent aluminum honeycomb profile units are assembled to each other and connected and fixed by means of the support component.

8 Claims, 4 Drawing Sheets

(56) References Cited

FOREIGN PATENT DOCUMENTS

| | | | |
|---|---|---|---|
| CN | 205836828 U | 12/2016 | |
| CN | 206983990 U | 2/2018 | |
| CN | 109050552 A | 12/2018 | |
| CN | 109878541 A | 6/2019 | |
| EP | 1527844 A1 | 5/2005 | |
| JP | H04237667 A | 8/1992 | |
| JP | H05139295 A | 6/1993 | |
| JP | H08197173 A | 8/1996 | |

OTHER PUBLICATIONS

International Search Report for PCT/CN2019/114370 dated Feb. 11, 2020, ISA/CN.

\* cited by examiner

RAIL VEHICLE, DRIVER'S CABIN AND COMPOSITE ALUMINUM PLATE ASSEMBLY

The present application is a National Phase entry of PCT Application No. PCT/CN2019/114370, filed on Oct. 30, 2019, which claims the priority to Chinese Patent Application No. 201910157014.7, titled "RAIL VEHICLE, DRIVER'S CABIN AND COMPOSITE ALUMINUM PLATE ASSEMBLY", filed with the China National Intellectual Property Administration on Mar. 1, 2019, the entire disclosures of which are incorporated herein by reference.

FIELD

This application relates to the technical field of rail vehicles, and in particular to a rail vehicle, a cab and a composite aluminum plate assembly.

BACKGROUND

A rail vehicle, as an important vehicle, has been widely used all over the world. With the improvement of people's living standards, more and more people's travel requirements are met. From the perspective of users, it is urgent to study the lightweight, comfort and safety of the rail vehicle, so as to solve customer needs and improve user experience.

The cab of the rail vehicle is located in the front of the rail vehicle, and the structure thereof is quite different from a compartment at other positions. Considering the position particularity of the cab, the structure of the cab of the rail vehicle is also different from other compartments of the vehicle body. Generally, the cab of the rail vehicle mostly adopts an aluminum plate single plate-welding structure. In order to improve the mechanical property of the cab, the welding quantity is large, which causes the poor manufacturability of the cab. Moreover, the weight of the cab is also heavy due to the large welding quantity.

Therefore, a technical problem urgently to be solved by those skilled in the art is how to improve the mechanical property of the cab and reduce the weight of the cab as much as possible.

SUMMARY

A composite aluminum plate assembly is provided according to the present application, which includes at least two aluminum honeycomb profile units. Each aluminum honeycomb profile unit includes a sandwich aluminum honeycomb, a first aluminum plate and a second aluminum plate. The sandwich aluminum honeycomb is filled in between the first aluminum plate and the second aluminum plate. An extended section is provided on a butt-joint side of at least one of the aluminum plates on two sides of each aluminum honeycomb profile unit, and the extended section extends to the outside of the sandwich aluminum honeycomb on this side. The composite aluminum plate assembly further includes a support member, and the strength of the support member is greater than that of the sandwich aluminum honeycomb. Each extended section of the two adjacent aluminum honeycomb profile units is correspondingly assembled and fixedly connected by the support member.

The composite aluminum plate assembly provided according to the present application is formed by at least two aluminum honeycomb profile units, and a connecting position of the two adjacent aluminum honeycomb profile units is connected by the support member which has a greater strength than that of the sandwich aluminum honeycomb, thereby increasing the strength of the connecting position of the two adjacent aluminum honeycomb profile units, effectively avoiding a weld defect and a deformation at a splicing position of the aluminum honeycomb profile unit, and ensuring the weld between the aluminum honeycomb profile units to be reliable and beautiful.

Optionally, the corresponding extended sections of the two adjacent aluminum honeycomb profile units are butt-jointed, and the extended section is provided on the corresponding butt-joint side of the first aluminum plate and the second aluminum plate. A chamber is formed by all the extended sections on the butt-joint sides. The support member is filled in the chamber, and the support member supports and is positioned between the aluminum plates on two sides.

Optionally, the support member is a connecting aluminum honeycomb, and the chamber is at least partially filled with the connecting aluminum honeycomb. A size of a honeycomb unit of the connecting aluminum honeycomb is smaller than that of the sandwich aluminum honeycomb.

Optionally, the support member further includes two auxiliary aluminum plates, and the connecting aluminum honeycomb is sandwiched between the two auxiliary aluminum plates. The two auxiliary aluminum plates are fitted with the extended sections on the corresponding sides, and the corresponding auxiliary aluminum plate covers a butt joint seam formed by the two extended sections on the corresponding side.

Optionally, the support member is an aluminum profile and includes a first auxiliary aluminum plate, a second auxiliary aluminum plate and a reinforcing rib. The first auxiliary aluminum plate is parallel to the second auxiliary aluminum plate. The reinforcing rib supports between the first auxiliary aluminum plate and the second auxiliary aluminum plate. The first auxiliary aluminum plate and the second auxiliary aluminum plate are respectively fitted with the extended sections on the two sides.

Optionally, the first auxiliary aluminum plate and the second auxiliary aluminum plate cover the butt-joint seam formed by the two extended sections on the corresponding side.

Optionally, the support member is a box-shaped aluminum profile, each extended section abuts against and is welded to an external surface on the corresponding side of the support member.

Optionally, the aluminum honeycomb profile unit includes an aluminum profile which is integrally formed and forms a hollow structure. The first aluminum plate and the second aluminum plate are respectively two side surfaces of the aluminum profile. The extended section extends outward from the first aluminum plate and abuts against an upper surface of the box-shaped aluminum profile, and the thickness of the extended section is greater than that of a body of the first aluminum plate. The sandwich aluminum honeycomb is filled in the hollow structure. The second aluminum plate is connected to a side wall of the box-shaped aluminum profile by welding through a connecting plate.

Optionally, the box-shaped aluminum profile is an integrally formed structure. A boss is provided on the upper surface of the box-shaped aluminum profile, and each of two sides of the boss and an end face of the extended section on the corresponding side form a welded groove.

Optionally, the two extended sections that are butt jointed with each other are connected by welding. Or/and the extended section is connected to the support member by welding.

A cab of a rail vehicle is further provided according to the present application, which includes a front half portion and a rear half portion. The front half portion includes a front portion of a side door frame, and the rear half portion includes a rear portion of the side door frame and a roof portion. The front half portion includes a first skeleton structure and an aluminum single plate covered outside the first skeleton structure. The rear half portion includes a second skeleton structure formed by a top curved beam and a side portion lateral beam, and the composite aluminum plate assembly described in any one of the above is covered outside the second skeleton structure.

Because a curved surface of the rear half portion of the rail vehicle changes gently, the composite aluminum plate assembly can be used in the rear half portion of the cab of the rail vehicle, that is, the composite aluminum plate assembly is arranged at the top, the left and the right of the cab. The composite aluminum plate assembly at the top, the left and the right can be welded to form a whole through suitable aluminum honeycomb profile units. This can greatly reduce the welding quantity, reduce welding deformation, improve the stiffness of the cab, meet the requirement of lightweight of the vehicle, and function to insulate the sound and reduce the noise.

In addition, the front half portion of the cab adopts a structure of the aluminum single plate plus a cross rib, which is conducive to realize the complex structure of the front half portion of the cab, and meet the design of small ridge and inverse curve of the front half portion.

The front half portion and the rear half portion of the cab adopts different structural design, which not only meets the requirement of lightweight of the vehicle, but also meets the requirement of industrial design of the artwork.

Optionally, the first skeleton structure includes multiple parallel lateral plates, and further includes a longitudinal plate cross connected with the lateral plate. The first skeleton structure forms a front window mounting skeleton, a front lamp mounting skeleton and a side door lower support skeleton.

Optionally, the number of top curved beams is at least one, and the top curved beam is successively arranged at intervals in a length direction of a vehicle body. Two end portions of the top curved beam are respectively connected to the side portion lateral beam closest thereto.

In addition, a rail vehicle is further provided according to the present application, which includes the composite aluminum plate assembly described in any one of the above, or/and the cab of the rail vehicle described in any one of the above.

Figure 1:
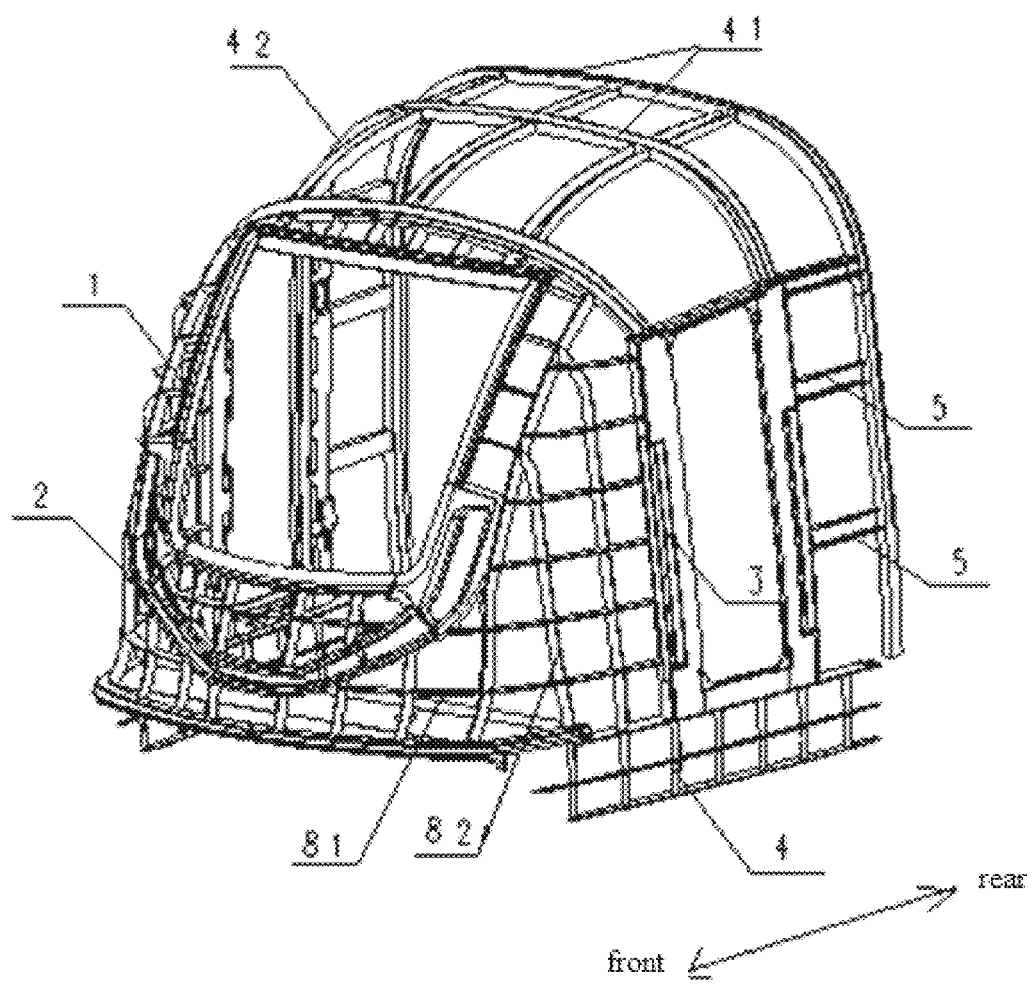
FIG. 1 is a schematic view showing a skeleton structure of a cab of a rail vehicle in an embodiment of the present application.
Figure 2:
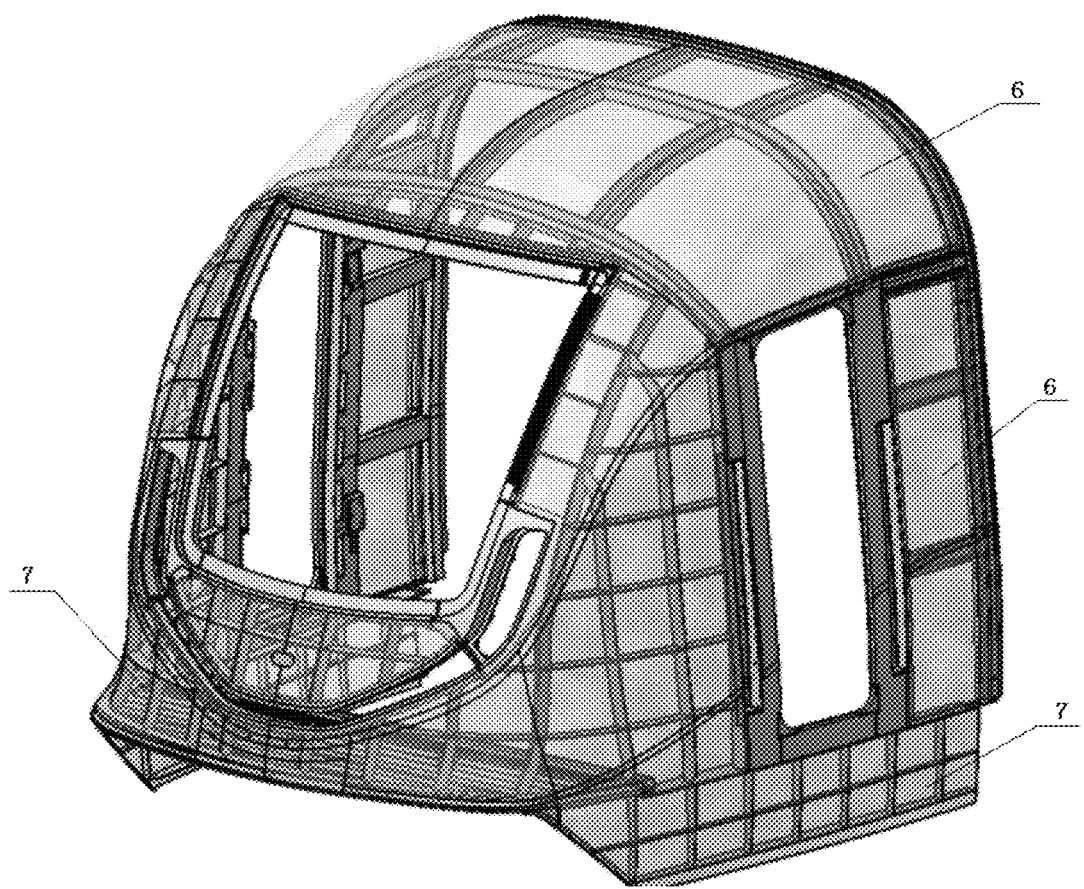
FIG. 2 is a schematic view showing a structure that an aluminum single plate and a composite aluminum plate assembly are provided on the skeleton structure in FIG. 1.
Figure 3:
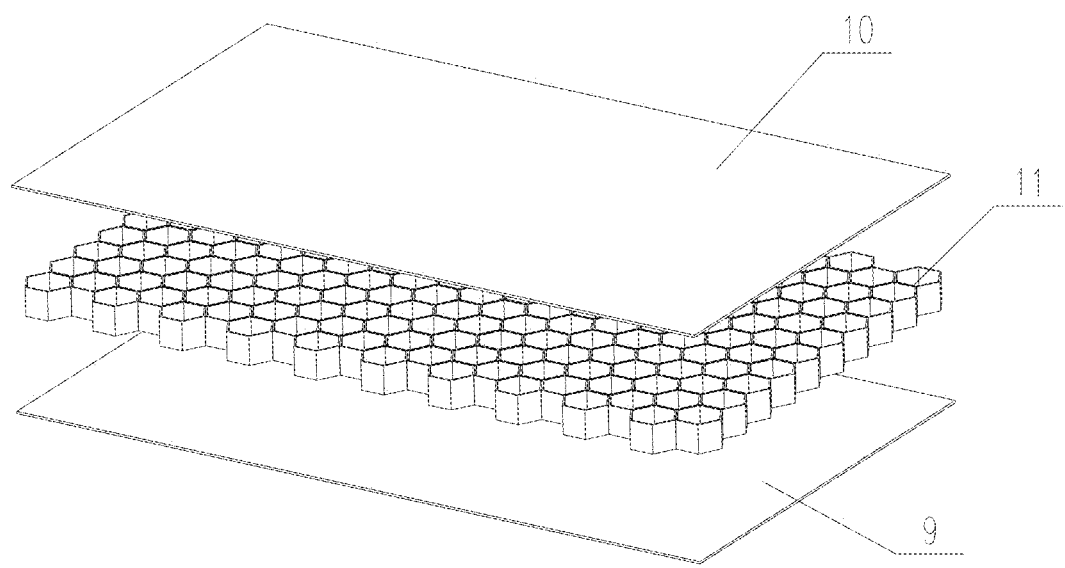
FIG. 3 is a schematic exploded view of an aluminum honeycomb profile unit in an embodiment of the present application.
Figure 4:
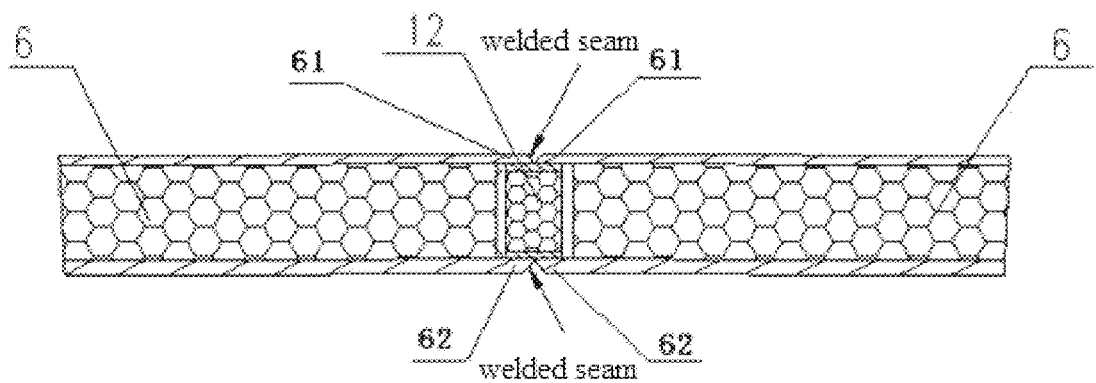
FIG. 4 is a schematic partial view of a connecting position between two adjacent aluminum honeycomb profile units in a first embodiment of the present application.
Figure 5:
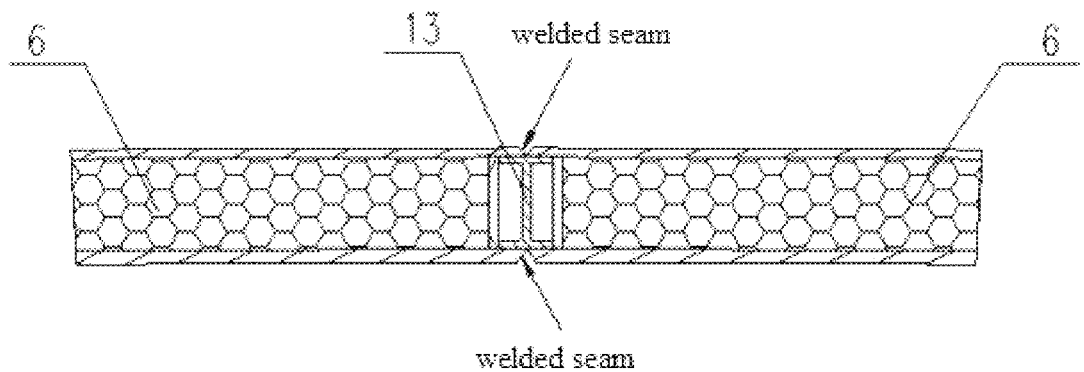
FIG. 5 is a schematic partial view of the connecting position between two adjacent aluminum honeycomb profile units in a second embodiment of the present application.
Figure 6:
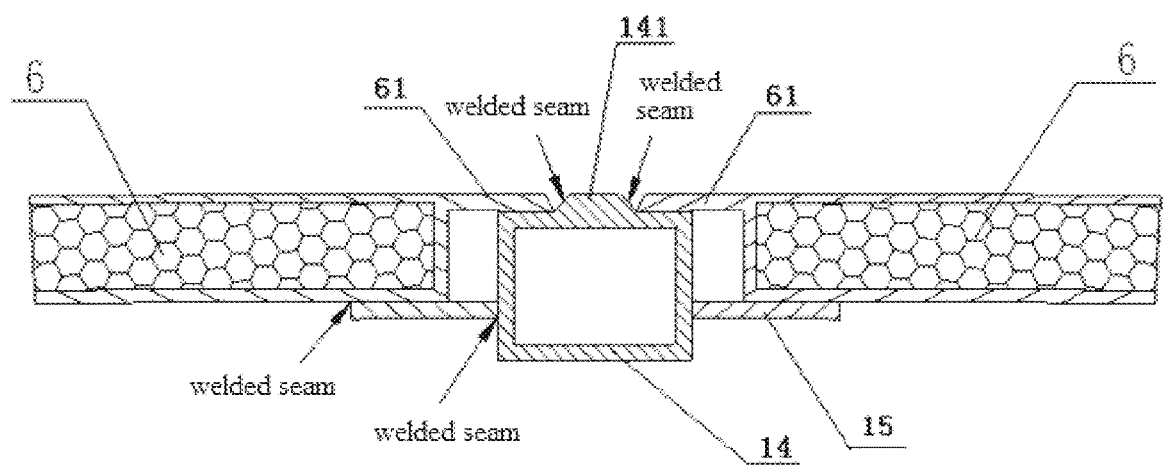
FIG. 6 is a schematic partial view of the connecting position between two adjacent aluminum honeycomb profile units in a third embodiment of the present application.

Reference Numerals in FIGS. 1 to 6 are listed as follows:

| | |
|---|---|
| 1 front window mounting skeleton, | 2 front lamp mounting skeleton, |
| 3 side door frame, | 4 side door lower support skeleton, |
| 41 top curved beam, | 42 beam, |
| 5 side portion lateral beam, | 81 lateral plate, |
| 82 longitudinal plate, | 6 aluminum honeycomb profile unit, |
| 61 first extended section, | 62 second extended section, |
| 7 aluminum single plate, | 9 second aluminum plate, |
| 10 first aluminum plate, | 11 sandwich aluminum honeycomb, |
| 12 connecting aluminum honeycomb, | 13 aluminum profile, |
| 14 box-shaped aluminum profile, | 141 boss, |
| 15 connecting plate. | |

DETAILED DESCRIPTION OF THE EMBODIMENTS

For making those skilled in the art better understand the technical solution of the present application, the present application will be described further in detail hereinafter in conjunction with the drawings and embodiments.

A rail vehicle provided according to the present application includes a cab. Specifically, the cab is further divided into a front half portion and a rear half portion based on the different structure. The front haft portion mainly includes a front portion of a side door frame, and the rear half portion includes a rear portion of the side door frame and a roof portion. The definition of the front and the rear in the present application refers to the reference numerals in FIG. 1.

The front half portion includes a first skeleton structure and an aluminum single plate 7 covering an outside of the first skeleton structure. The aluminum single plate 7 refers to a single layer of aluminum plate. The first skeleton structure further includes multiple parallel lateral plates 81 and longitudinal plates 82. The lateral plates 81 are in cross-connection with the longitudinal plate 82, that is to say, the lateral plates 81 and the longitudinal plate 82s form a cross-rib structure. The cross-rib structure functions to support the aluminum single plate 7 attached on the surface thereof.

The thickness of the aluminum single plate 7 may be reasonably set according to the specific vehicle.

The rear half portion includes a second skeleton structure formed by a top curved beam 41 and a side portion lateral beam 5. The top curved beam 41 is arranged at the top of the cab to form a top support skeleton. The side portion lateral beam 5 is arranged at a rear position of the side door frame of the cab to form a support skeleton at a rear position of the side door frame. The composite aluminum plate assembly covers an outside of the second skeleton structure of the rear half portion.

The composite aluminum plate assembly in the present application includes at least two aluminum honeycomb profile units 6. Each aluminum honeycomb profile unit includes a sandwich aluminum honeycomb, a first aluminum plate 10 and a second aluminum plate 9, and the sandwich aluminum honeycomb 11 is filled in between the first aluminum plate 10 and the second aluminum plate 9. An extended section is provided at a butt-joint side of at least one of the aluminum plates on two sides of each aluminum honeycomb profile unit 6, and the extended section is arranged outside the sandwich aluminum honeycomb 11, that is, a surface of the extended section is not provided with the sandwich aluminum honeycomb 11 at a corresponding position.

That is to say, the extended section is provided on the butt-joint side of at least one of the first aluminum plate 10 and the second aluminum plate 9. Certainly, the extended section can be arranged on the butt-joint sides of both the first aluminum plate 10 and the second aluminum plate 9. Certainly, for standardizing design, the extended section can be arranged on two sides of the first aluminum plate 10 and the second aluminum plate 9, so as to increase the assembly flexibility. It should be noted that, the butt-joint side refers to a side that two adjacent aluminum honeycomb profile units 6 are correspondingly connected with each other.

In the present application, the composite aluminum plate assembly further includes a support member. The strength of the support member is greater than that of the sandwich aluminum honeycomb. Each extended section of the two adjacent aluminum honeycomb profile units 6 is correspondingly assembled and fixedly connected by the support member.

It can be seen from the above description that, the composite aluminum plate assembly provided according to the present application is formed by at least two aluminum honeycomb profile units 6, and a connecting position of the two adjacent aluminum honeycomb profile units 6 is connected by the support member which has a greater strength than that of the sandwich aluminum honeycomb, thereby increasing the strength of the connecting position of the two adjacent aluminum honeycomb profile units, effectively avoiding weld defect and deformation at a splicing position of the aluminum honeycomb profile unit, and ensuring the welding between the aluminum honeycomb profile units 6 to be reliable and beautiful.

Because a curved surface of the rear half portion of the rail vehicle changes gently, the composite aluminum plate assembly may be used in the rear half portion of the cab of the rail vehicle, that is, the composite aluminum plate assembly is arranged at the top, the left and the right of the cab. The composite aluminum plate assembly at the top, the left and the right may be welded to form the entire cab through suitable aluminum honeycomb profile units. This can greatly reduce the welding quantity, reduce welding deformation, improve the stiffness of the cab, meet the requirement of lightweight of the vehicle, and function to insulate the sound and reduce the noise.

In addition, the front half portion of the cab adopts a structure of the aluminum single plate 7 plus a cross rib, which is conducive to realize the complex structure of the front half portion of the cab, and meet the design of small ridge and inverse curve of the front half portion.

The front half portion and the rear half portion of the cab adopts different structural designs, which not only meets the requirement of lightweight of the vehicle, but also meets the requirement of industrial design of the artwork.

According to the different structures of the support member and the aluminum honeycomb profile unit, several different embodiments are given, as described below.

In a first specific embodiment, corresponding extended sections of the two adjacent aluminum honeycomb profile units 6 are butt-jointed, that is to say, the extended section of the first aluminum honeycomb profile unit is in contact with and butt-jointed with the extended section of the second aluminum honeycomb profile unit. The extended section is provided on the corresponding butt-joint side of the first aluminum plate 10 and the second aluminum plate 9. A chamber is formed by all the extended sections on the butt-joint sides. The support member is filled in the chamber, and the support member supports and is positioned between the aluminum plates on two sides.

That is, the first aluminum plate 10 is provided with a first extended section 61, and the second aluminum plate 9 is provided with a second extended section 62. The two first extended sections 61 and the two second extended sections 62 of the two aluminum honeycomb profile units are correspondingly butt-jointed, respectively. The two first extended sections and the two second extended sections form the chamber, and the support member supports in the chamber.

In the embodiment, the support member is directly located inside the chamber formed by the first aluminum plate 10 and the second aluminum plate 9, and the shape of the support member does not need to be considered. Thus, the composite aluminum plate assembly formed in this way has high strength and beautiful appearance.

Specifically, the support member may be a connecting aluminum honeycomb, and the chamber is at least partially filled with the connecting aluminum honeycomb. A size of a honeycomb unit of the connecting aluminum honeycomb is smaller than that of the sandwich aluminum honeycomb. That is to say, the particle size of the honeycomb unit of the connecting aluminum honeycomb is small, so the strength is high. The chamber formed by each extended section is filled with the connecting aluminum honeycomb structure, which is conductive to further reducing the weight.

Each extended section may be fixedly connected with the connecting aluminum honeycomb 12 by welding, such as brazing and the like.

In order to further increase the strength of the connecting position, the support member may further include two auxiliary aluminum plates, and the connecting aluminum honeycomb 12 is sandwiched between the two auxiliary aluminum plates. The two auxiliary aluminum plates are fitted with the extended sections on the corresponding sides, and the corresponding auxiliary aluminum plates cover a butt joint seam formed by the two extended sections on the corresponding sides.

That is to say, the support member is also the composite aluminum plate having the aluminum honeycomb. When the extended sections on the two sides are welded, the extended section is fixedly connected with the auxiliary aluminum plate on the corresponding side, and the welding contact area is large and the welding strength is high.

In another specific embodiment, the support member may be an aluminum profile 13 and includes a first auxiliary aluminum plate, a second auxiliary aluminum plate and a reinforcing rib. The first auxiliary aluminum plate is parallel to the second auxiliary aluminum plate. The reinforcing rib supports between the first auxiliary aluminum plate and the second auxiliary aluminum plate. The first auxiliary aluminum plate and the second auxiliary aluminum plate are respectively fitted with the extended sections on the two sides.

That is to say, in the embodiment, the aluminum profile has no aluminum honeycomb, and is only a profile structure.

In the embodiment, the aluminum profile has a simple structure and a low use cost.

In a preferred embodiment, the first auxiliary aluminum plate and the second auxiliary aluminum plate cover the butt-joint seam formed by the two extended sections on the corresponding side. That is, the first auxiliary aluminum plate is fixed with the extended section on the corresponding side by welding, and the second auxiliary aluminum plate is fixed with the extended section on the corresponding side by welding, thereby the welding strength is increased.

The support member is a box-shaped aluminum profile 14, and each extended section abuts against and is welded to an external surface on the corresponding side of the support member.

In the above embodiments, the aluminum honeycomb profile unit includes an aluminum profile which is integrally formed and forms a hollow structure. The first aluminum plate 10 and the second aluminum plate 9 are respectively two side surfaces of the aluminum profile. The extended section extends outward from the first aluminum plate 10 and abuts against an upper surface of the box-shaped aluminum profile, and a thickness of the extended section is greater than that of a body of the first aluminum plate 10, the sandwich aluminum honeycomb 11 is filled in the hollow structure. The second aluminum plate 9 is connected to a side wall of the box-shaped aluminum profile by welding through a connecting plate 15.

In the embodiment, the sandwich aluminum honeycomb 11 is filled in the aluminum profile which is closed all around. The aluminum profile which is closed all around has a high use intensity and the aluminum profile can further interact with the sandwich aluminum honeycomb 11 in which is filled into the aluminum profile, so as to increase the use intensity.

Further, the box-shaped aluminum profile 14 is an integrally formed structure, a boss 141 is provided on the upper surface of the box-shaped aluminum profile 14, and each of two sides of the boss 141 and an end face of the extended section on the corresponding side form a welded groove. That is, the extended sections on the same side do not contact, and the extended section is welded with the box-shaped aluminum profile 14.

In the above embodiments, the two extended sections are also connected with each other by welding when the two extended sections are butt-jointed.

When the two extended sections do not contact and the two extended sections contact with the support member, the two extended sections are also connected to the support member by welding.

In the above embodiments, the first skeleton structure forms a front window mounting skeleton 1, a front lamp mounting skeleton 2 and a side door lower support skeleton 4. That is, a front window is mounted on the front window mounting skeleton 1, a lamp is mounted on the front lamp mounting skeleton 2, and the side door lower support skeleton 4 functions to support a side door frame 3 to a certain extent.

At least one top curved beams 41 of the cab is provided according to the present application, and each top curved beam 41 is successively arranged and spaced apart in a length direction of a vehicle body. Two end portions of the top curved beam 41 are respectively connected to a side portion lateral beam 5 closest thereto.

A beam 42 arranged in cross with the top curved beam 41 may be further provided, so as to increase the support capacity.

Based on the composite aluminum plate assembly, a rail vehicle is further provided according to the present application, which includes the composite aluminum plate assembly described in any one of the embodiments, or/and the cab described in any one of the embodiments.

The rail vehicle and the cab thereof include the composite aluminum plate assembly. Therefore, the rail vehicle and the cab also have the technical effect of the composite aluminum plate assembly.

Other aspects of the rail vehicle may refer to the conventional technology, and will not be described herein.

The railway vehicle, the cab and the composite aluminum plate assembly according to the present application are described in detail hereinbefore. The principle and the embodiments of the present application are illustrated herein by specific examples. The above description of examples is only intended to help the understanding of the method and spirit of the present application. It should be noted that, for those skilled in the art, many modifications and improvements may be made to the present application without departing from the principle of the present application, and these modifications and improvements are also deemed to fall into the protection scope of the present application defined by the claims.

What is claimed is:

1. A composite aluminum plate assembly, comprising at least two aluminum honeycomb profile units, wherein, each aluminum honeycomb profile unit comprises a sandwich aluminum honeycomb, a first aluminum plate and a second aluminum plate, and the sandwich aluminum honeycomb is filled in between the first aluminum plate and the second aluminum plate; an extended section is provided on a butt-joint side of at least one of the aluminum plates on two sides of each aluminum honeycomb profile unit, and the extended section extends to an outside of the sandwich aluminum honeycomb on this side; the composite aluminum plate assembly further comprises a support member, and the strength of the support member is greater than the strength of the sandwich aluminum honeycomb, each extended section of the two adjacent aluminum honeycomb profile units is correspondingly assembled and fixedly connected by the support member, the support member is an aluminum profile and comprises a first auxiliary aluminum plate, a second auxiliary aluminum plate and a reinforcing rib, the first auxiliary aluminum plate is parallel to the second auxiliary aluminum plate, the reinforcing rib supports between the first auxiliary aluminum plate and the second auxiliary aluminum plate to form an "H" shape, the first auxiliary aluminum plate and the second auxiliary aluminum plate are respectively fitted with the extended sections on the two sides, the first auxiliary aluminum plate and the second auxiliary aluminum plate cover the butt-joint seam formed by the two extended sections on the corresponding side.

2. The composite aluminum plate assembly according to claim 1, wherein, the two extended sections that are butt jointed with each other are connected by welding; or/and the extended section is connected to the support member by welding.

3. A cab of a rail vehicle, comprising:
a front half portion; and
a rear half portion,
wherein, the front half portion comprises a front portion of a side door frame, and the rear half portion comprises a rear portion of the side door frame and a roof portion; the front half portion comprises a first skeleton structure and an aluminum single plate covered outside the first skeleton structure; the rear half portion comprises a second skeleton structure formed by a top curved beam and a side portion lateral beam, and the composite aluminum plate assembly according to claim 1 is covered outside the second skeleton structure.

4. The cab according to claim 3, wherein, the first skeleton structure comprises a plurality of parallel lateral plates, and further comprises a longitudinal plate in cross-connection with the lateral plate, the first skeleton structure forms a front window mounting skeleton, a front lamp mounting skeleton and a side door lower support skeleton.

5. The cab according to claim 3, wherein, at least one top curved beam is provided, and each top curved beam is successively arranged and space apart in a longitudinal direction of a vehicle body, two end portions of the top curved beam are respectively connected to the side portion lateral beam closest thereto.

6. A rail vehicle, comprising:
the composite aluminum plate assembly according to claim 1;
or/and a cab of a rail vehicle, comprising:
a front half portion; and
a rear half portion,
wherein, the front half portion comprises a front portion of a side door frame, and the rear half portion comprises a rear portion of the side door frame and a roof portion; the front half portion comprises a first skeleton structure and an aluminum single plate covered outside the first skeleton structure; the rear half portion comprises a second skeleton structure formed by a top curved beam and a side portion lateral beam, and the composite aluminum plate assembly according to claim 1 is covered outside the second skeleton structure.

7. A composite aluminum plate assembly, comprising at least two aluminum honeycomb profile units, wherein, each aluminum honeycomb profile unit comprises a sandwich aluminum honeycomb, a first aluminum plate and a second aluminum plate, and the sandwich aluminum honeycomb is filled in between the first aluminum plate and the second aluminum plate; an extended section is provided on a butt-joint side of at least one of the aluminum plates on two sides of each aluminum honeycomb profile unit, and the extended section extends to an outside of the sandwich aluminum honeycomb on this side; the composite aluminum plate assembly further comprises a support member, and the strength of the support member is greater than the strength of the sandwich aluminum honeycomb, each extended section of the two adjacent aluminum honeycomb profile units is correspondingly assembled and fixedly connected by the support member, the support member is a box-shaped aluminum profile, each extended section abuts against and is welded to an external surface on the corresponding side of the support member, the aluminum honeycomb profile unit comprises an aluminum profile which is integrally formed and forms a hollow structure, the first aluminum plate and the second aluminum plate are respectively two side surfaces of the aluminum profile, the extended section extends outward from the first aluminum plate and abuts against an upper surface of the box-shaped aluminum profile, and a thickness of the extended section is greater than a thickness of a body of the first aluminum plate, the sandwich aluminum honeycomb is filled in the hollow structure; the second aluminum plate is connected to a side wall of the box-shaped aluminum profile by welding through a connecting plate.

8. The composite aluminum plate assembly according to claim 7, wherein, the box-shaped aluminum profile is an integrally formed structure, a boss is provided on the upper surface of the box-shaped aluminum profile, and each of two sides of the boss and an end face of the extended section on the corresponding side form a welded groove.

* * * * *